United States Patent [19]

Brown

[11] 4,121,877
[45] Oct. 24, 1978

[54] MAGNETIC TAPE CASSETTE STORAGE CASE

[76] Inventor: James L. Brown, 1227 W. Cabrini, Apt. 901, Chicago, Ill. 60607

[21] Appl. No.: 779,869

[22] Filed: Mar. 21, 1977

[51] Int. Cl.² ............................................. A47B 81/06
[52] U.S. Cl. ..................................... 312/19; 206/387; 211/40; 312/15
[58] Field of Search ..................................... 312/13–20, 312/319; 211/40; 206/387; 220/339

[56] References Cited

U.S. PATENT DOCUMENTS

| | | | |
|---|---|---|---|
| 1,009,373 | 11/1911 | Amo | 312/18 |
| 1,067,799 | 7/1913 | Colley | 312/15 |
| 1,366,427 | 1/1921 | Smith | 312/19 |
| 2,300,333 | 10/1942 | Barton | 312/15 |
| 2,352,710 | 7/1944 | Hart | 312/19 |
| 2,805,111 | 9/1957 | Jarnot | 312/42 |
| 3,084,983 | 4/1963 | Stuart | 312/13 |
| 3,489,475 | 1/1970 | Boyce et al. | 312/14 |
| 3,582,168 | 6/1971 | Bian | 312/19 |
| 3,811,745 | 5/1974 | Cylke | 312/13 |
| 3,866,990 | 2/1975 | McRae | 312/15 |

FOREIGN PATENT DOCUMENTS

| | | | |
|---|---|---|---|
| 1,194,111 | 4/1902 | France | 312/15 |
| 115,947 | 5/1918 | United Kingdom | 312/19 |
| 332,665 | 7/1930 | United Kingdom | 312/15 |

Primary Examiner—Mervin Stein
Assistant Examiner—Victor N. Sakran
Attorney, Agent, or Firm—Bernard L. Kleinke

[57] ABSTRACT

A case for storing a group of smaller boxes, such as boxes containing magnetic tape cassettes, includes a container for receiving the boxes in a side-by-side arrangement, and a keyboard having a plurality of levers for elevating selectively and individually the boxes through an open mouth in the container. The keyboard includes a plurality of pivotally mounted keys extending under the boxes through an opening in the container and outwardly from the interior thereof. The keys terminate in finger engageable distal end portions so that when a selected one of the keys is pushed downwardly by the finger of the user to select a given cassette box, the selected key pivots about its intermediate portion to cause the selected cassette box to be elevated above the remaining boxes to permit the user to grasp in a convenient manner the selected box and remove it from the case.

8 Claims, 3 Drawing Figures

U.S. Patent     Oct. 24, 1978     4,121,877
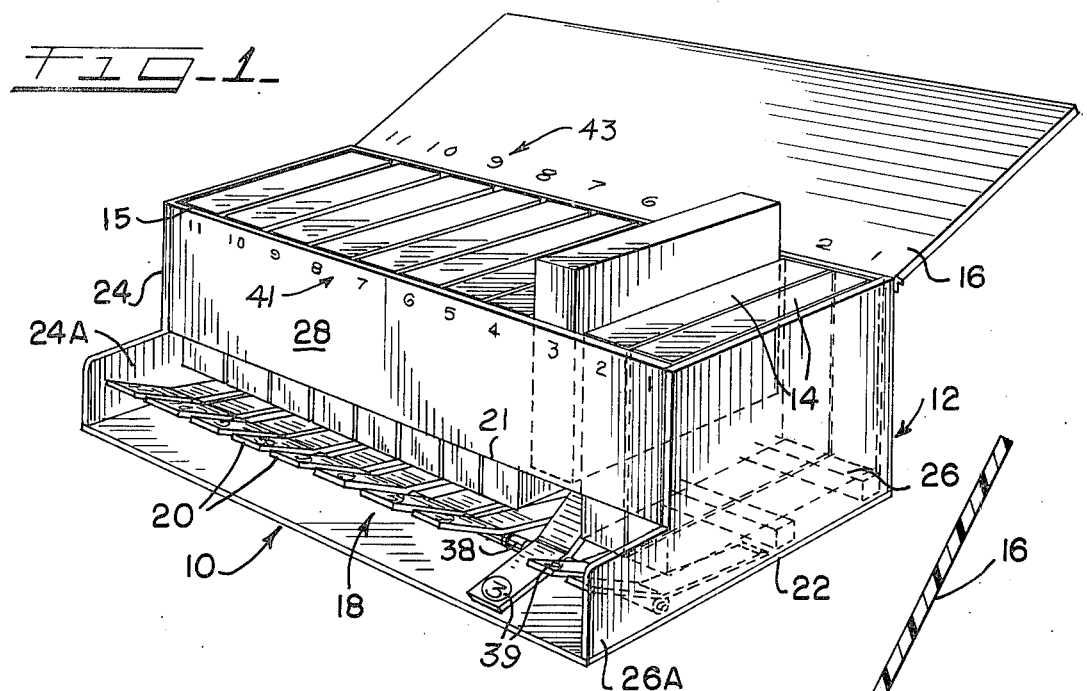
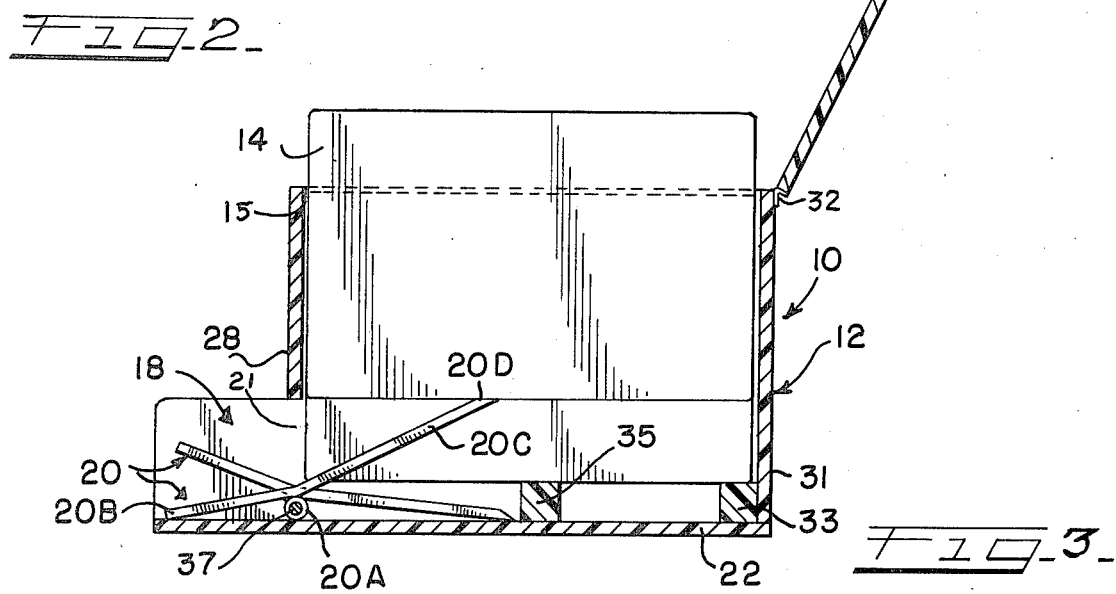
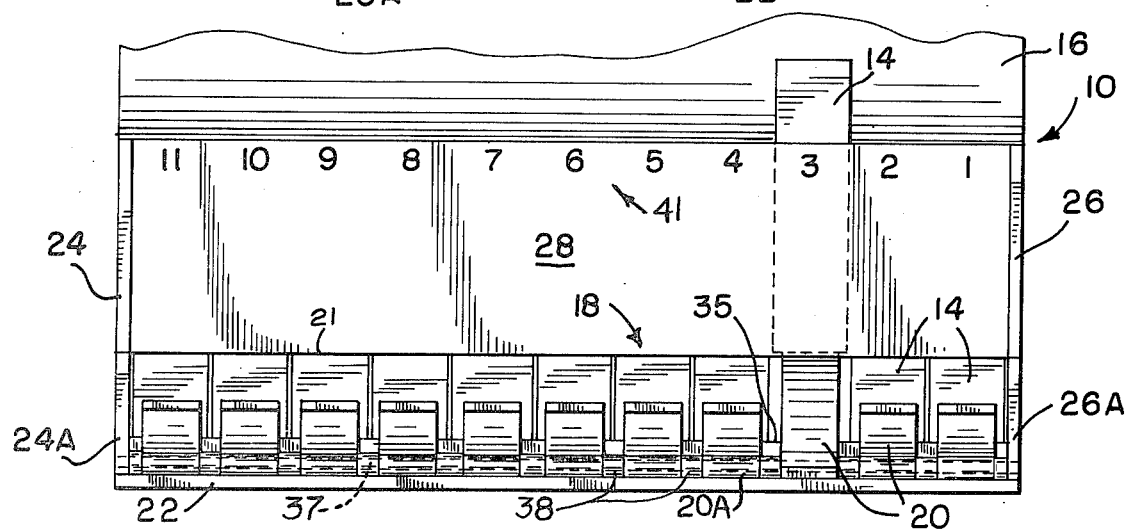

MAGNETIC TAPE CASSETTE STORAGE CASE

The present invention relates in general to a case for storing a group of boxes containing magnetic tape cassettes, and more particularly relates to a case for storing a group of magnetic tape cassette storage boxes in a side-by-side closely stacked manner.

Many different types and kinds of cassettee tape storage containers have been known in the prior art. Some of them have been in the form of containers which receive a series of boxes containing the magnet tape cassette cartridges in a closely stacked side-by-side arrangement. Similarly, there have also been storage containers for receiving a group of 8-track magnetic tape cartridges. The storage containers have been designed so that the magnetic tape storage boxes or cartridges are very closely stacked relative to one another for high density packing purposes to conserve space. While such containers have been satisfactory for some applications, it would be highly desirable to have a magnetic tape storage case which includes a mechanism for enabling the user to readily gain access to one or more of the cassette tape storage boxes or 8-track cartridges. Such a case should be relatively inexpensive to manufacture and extremely simple to operate and use. Also, when one or more of the boxes is removed, the remaining units should remain in position without being disturbed to any great extent.

Therefore, it is the principal object of the present invention to provide a new and improved magnetic tape storage case, which enables the user to remove selected ones of the magnetic tape units, the units being closely stacked in a side-by-side arrangement within the case.

Another object of the present invention is to provide such a new and improved magnetic tape storage case, which is relatively inexpensive to manufacture and which is very convenient to use.

Briefly, the above and further objects of the present invention are realized by providing a case for storing a group of magnetic tape units, the case including a container for receiving the units in a side-by-side arrangement in the interior thereof. A keyboard selectively and individually elevates the units through an open mouth in the container. The keyboard includes a plurality of pivotally mounted keys extending under the boxes and through an opening in the container and outwardly from the interior of the container. The keys terminate in outer finger engageable distal end portions so that the user can depress a selected one of the keys to cause the selected one of the units to be elevated through the open mouth of the container.

The above, and still highly important objects and advantages of the invention will become apparent from the following detailed specification, appended claims, and attached drawings, wherein:

FIG. 1 is a pictorial view of the magnetic tape storage case, which is constructed in accordance with the present invention and which is illustrated with one of the magnetic tape units being elevated for ease of access thereto;

FIG. 2 is a side cross-sectional view of the case of FIG. 1;

FIG. 3 is a front elevational view of the case of FIG. 1.

Referring now to the drawings, and more particularly to FIG. 1 thereof, there is shown a magnetic tape storage case 10, which is constructed in accordance with the present invention. The storage case 10 generally comprises an opened-top container 12 for receiving and storing a group of units 14 in a closely-stacked side-by-side arrangement, the units 14 being either magnetic tape cassette cartridge storage boxes containing cassettes (not shown) or eight-track magnetic tape cartridges. The container 12 includes an open mouth 15 through which are inserted the units 14, which have the upper surfaces disposed in a common plane at the mouth 15. A keyboard 18 disposed at the lower front portion of the container 12 enables the units to be selectively and individually elevated out of the plane of the mouth 15 to enable the user to readily grasp a selected one of the units 14 for removing it from the container 12. As hereinafter described in greater detail, the keyboard 18 includes a series of bent levers 20 arranged in a common plane. The keys or levers 20 are each pivotally mounted and extend under the units 14 through an opening 21 at the bottom front portion of the container 12, the levers 20 extending outwardly from the interior of the container and terminating in outer finger engageable distal end portions.

In use, the magnetic tape units 14 are placed in the container 12 through its open mouth 15 so that the units 14 are placed in a side-by-side relationship in a closely stacked manner as shown in FIG. 1 of the drawings. The upper surfaces of the units 14 are disposed in a common plane with the upper edge of the mouth 15. Thereafter, the cover or lid 16 may be closed over the opened mouth 15 for storage purposes. Once it is desired to remove one or more of the units 14 from the case 10, the cover 16 is hingedly moved to an open position as shown in the drawings, and the user then selects the desired unit 14. Once the selection is made, the user then actuates the keyboard 18 as hereinafter described in greater detail to elevate the selected one of the units 14 so that its upper edge moves upwardly and rises out of the plane of the mouth 15.

As a result, the user can readily grasp the elevated unit 14 to remove it from the container 12. Simultaneously, therewith, or subsequently thereto, the keyboard 18 may be actuated to select additional units 14 in a similar manner. Once it is desired to return the units 14 to the case 10, the removed units are then slipped into their open spaces which they had previously vacated within the interior of the container 12 so that the cover 16 may then be closed.

Considering now the opened-top container 12 in greater detail, the container 12 is generally rectangular in shape and is adapted to contain a quantity of magnetic tape units 14. It should be understood that various different sizes and shapes of the container 12 may be employed. For example, the container 12 is dimensioned to receive and store either cassette cartridge boxes or eight-track cartridges. The length of the box would determine the number of units which can be stored within the case 10. The container includes a flat bottom wall 22 and a pair of end walls 24 and 26 which have a pair of forwardly projecting extension portions 24A and 26A, respectively, extending to the forward corner portions of the bottom wall 22. A front wall 28 is fixed at its opposite ends to the front side edges of the end walls 24 and 26, the front wall extending from the mouth 15 to the opening 21 immediately above the two projections 24A and 26A of the respective end walls 24 and 26. As shown in FIG. 2 of the drawings, a rear wall 31 is affixed at its opposite ends to the rear side edges of the end walls 24 and 26, and it has its bottom edge fixed to the bottom wall 22, the upper edge of the rear wall 31 cooperating with the upper edges of the two end walls and the front wall to define the mouth 15. A hinge 32 connects the cover 16 to the rear wall 31, the hinge 32 being in the form of a strip of tape secured to both the cover 16 and the rear wall 31. It should be understood that various different types and kinds of hinges can be used to connect the cover 16 to the rear wall 31.

A pair of elongated longitudinally extending blocks 33 and 35 are fixed to the bottom wall 22 of the container 12 to support the magnetic tape units 14 from below. In this regard, the blocks 33 and 35 serve as extensions or projections above the top surface of the bottom wall 22. The block 33 is disposed in abutting relationship with the rear wall 31 and is fixed both to the rear wall 31 and the bottom wall 22. The block 35 is disposed in a parallel-spaced apart relationship with the block 33, and the block 35 is spaced forwardly of the block 33 by a sufficient distance such that the magnetic tape units 14 can rest upon the upper surfaces of the blocks 33 and 35 and be supported from below. The height of the blocks 33 and 35 are of a sufficient amount to permit the levers 20 to extend under the forward portions of the units 14 as best seen in FIG. 2 of the drawings. It should be understood by those skilled in the art that, in place of a pair of parallel-spaced blocks, the bottom wall of the container 12 can be configured in the shape of a platform for supporting the magnetic tape unit 14 from below in a manner similar to the way in which the blocks 33 and 35 support the units 14.

Considering now the keys or levers 20, each one of the levers 20 includes a hinge sleeve 20A integrally connected on the underside of the lever 20 substantially midway between the front finger engageable end portion 20B and the rear unit engageable portion 20C. In the form of the invention as shown in the drawings, the hinge sleeve 20A is disposed somewhat closer to the forward end portion thereof. A hinge pin 37 is fixed at its opposite ends to the extension portions 24A and 26A of the end walls 24 and 26, respectively, and the hinge sleeves of the levers are threaded onto and freely rotate about the hinge 37 so that the levers are pivotally mounted on the longitudinally extending hinge pin 37. A plurality of cylindrical spacers 38 which are hollow throughout their lengths are also threaded onto and loosely receive the hinge pin 37, the spacers 38 being disposed between the levers 20 to maintain them in an equally spaced apart manner as best seen in FIG. 3 of the drawings.

The unit engageable rear end portion 20C extends under its unit 14 for elevating it upwardly when the lever 20 is pivoted about the axis of the pivot pin 37 in a counter-clockwise direction as viewed in FIG. 2 of the drawings. The rear end portion 20C terminates in a flattened beveled point or surface 20D (FIG. 2) to engage the bottom edge of its unit 14.

The sleeve 20A is disposed next to or slightly above the bottom wall 22 directly under the front wall 28 within the opening on 21. The front finger engageable portion 20B and the rear unit engageable portion 20C are disposed at an angular relationship relative to one another of an angle which would be between about 90° and about 175°, depending upon the travel of the lever 20 and the dimensions of the container 12 to enable the magnetic tape units 14 to be elevated by a sufficient amount out of the container 12 through its open mouth 15. Thus, the lever 20 is in the form of a bent lever to facilitate the movement of the magnetic tape units out of the container 12. In its normal rest position, the finger engageable front end portion 20B points upwardly and is disposed above the rear end portion 20C which has its rear end portion 20D engaging and resting upon the bottom wall 22. When the user actuates the lever 20, the user presses down on the upper surface of the finger engageable portion 20B to cause the lever to pivot in a counterclockwise direction a viewed in FIG. 2 of the drawings until the distal end portion of the front end portion 20B engages the upper surface of the bottom wall 22. In this regard, as the lever 20 pivots about the hinge pin 37, a rear end portion 20C moves into engagement with the underside of its magnetic tape unit 14 to push it upwardly until the forward end portion 20B engages the bottom wall 22. After the user removes the selected units 14 of the container 12, the lever 20 falls back to its initial position, since the rear end portion 20C is longer than and weights more than the front end portion 20B. It should be noted that each one of the levers 20 move independently of one another. Therefore, more than one of the magnetic tape units 14 can be selected by pressing the corresponding levers with the fingers of the user so that the selected units can be elevated simultaneously and independently of one another.

A set of numerical indicia 39 are disposed on the upper surface of the finger engageable portions 20B of the levers 20 to distinguish the levers, and corresponding similar numerical indicia generally indicated at 41 are disposed on the outer front face of the front wall 28 near the mouth 15 adjacent each one of the units 14. As a result, once the user has selected a given magnetic tape 14, the numerical indicia 41 opposite the selected unit 14 becomes visually and readily apparent to the user so that the corresponding numerical indicia 39 on the levers 20 can be easily located and depressed. Also, in order to help locate the lever 20 corresponding to the selected magnetic tape unit 14, a series of corresponding similar numerical indicia 43 is disposed on in the inside surface of the cover 14 near the mouth 15 opposite to the magnetic tape unit 14, the indicia 43 serving the same purpose as the indicia 41.

While the present invention has been described in connection with a particular embodiment thereof, it will be understood that many changes and modifications of this invention may be made by those skilled in the art without departing from the true spirit and scope thereof. For example, while the various different portions of the case 10 are preferred to be made of a suitable plastic material (except for the hinge pin 37), many different types and kinds of materials, such as metal, may be employed by those skilled in the art. Accordingly, the appended claims are intended to cover all such changes and modifications as fall within the true spirit and scope of the present invention.

What is claimed is:

1. A case for storing a group of magnetic tape units comprising:

a container for receiving the units in a side-by-side arrangement in the interior thereof, said container having bottom and side walls and having an open mouth, said container having an opening in one of its walls;

said opening being in the lower front portion of said container near said bottom wall, said units extending entirely across said interior to engage opposite ones of said walls;

a keyboard for elevating selectively and individually the units through said open mouth;

said keyboard including a plurality of pivotally mounted keys extending under the units through said opening and outwardly from the interior of said container, keys having an inner unit engageable portion and having an outer forwardly disposed distal end portion;

each one of said keys including one of said unit engageable portions disposed within the interior of said container below the units, said opening being disposed in the bottom portion of said front wall;

support means projecting from said bottom wall of said container near the rear portion thereof for supporting from below the units and for providing a space to the rear of said opening for receiving said inner unit engageable portions of said keys, the unit engageable portion of said keys being disposed under the front portions of said containers entirely within said space defined by said support means;

wherein said bottom wall includes a portion extending forwardly beyond the plane of the side walls, said opening being disposed above the forwardly extending portion, said keyboard being mounted adjacent said bottom wall and disposed at least a partially above the forwardly extending portion thereof; and means defining indicia on the finger engageable portions of said keys to distinguish visually between the keys, means defining corresponding indicia on said container to enable the user to locate one of said keys corresponding to a desired one of the units.

2. A case according to claim 1, wherein each one of said keys is in the form of a bent lever, said lever being pivotally mounted intermediate its ends to said container.

3. A case according to claim 1, wherein the support means includes a plurality of longitudinally extending elongated blocks.

4. A case according to claim 1, further including a cover being hingedly connected to said side walls for closing over said open mouth.

5. A case according to claim 1, wherein each one of the inner unit engageable portions of said keys includes a beveled distal end edge portion for engaging the units.

6. A case according to claim 1, wherein said interior of said container is an open space for enabling said units to be received therein immediately adjacent one another.

7. A case according to claim 1, wherein each one of said keys is in the form of a bent lever mounted pivotally intermediate its ends to said container, the bent lever havings its unit engaging portion and its finger engageable portion disposed at an angle of between about 90° and about 175° relative to one another.

8. A case according to claim 7, wherein each one of said levers is pivotally mounted about midway between its ends.

* * * * *